US007381689B2

(12) United States Patent
Panchalingam et al.

(10) Patent No.: US 7,381,689 B2
(45) Date of Patent: Jun. 3, 2008

(54) METHODS FOR INHIBITING HYDRATE BLOCKAGE IN OIL AND GAS PIPELINES USING AMIDE COMPOUNDS

(75) Inventors: Vaithilingam Panchalingam, Friendswood, TX (US); Michael Gregory Rudel, Richmond, TX (US); Scot Harris Bodnar, Houston, TX (US)

(73) Assignee: Champion Technologies, Inc., Houston, TX (US)

( * ) Notice: Subject to any disclaimer, the term of this patent is extended or adjusted under 35 U.S.C. 154(b) by 523 days.

(21) Appl. No.: 10/918,214

(22) Filed: Aug. 13, 2004

(65) Prior Publication Data

US 2005/0081432 A1 Apr. 21, 2005

Related U.S. Application Data

(60) Provisional application No. 60/513,311, filed on Oct. 21, 2003.

(51) Int. Cl.
*C09K 8/52* (2006.01)
*C09K 8/528* (2006.01)
*C10L 1/222* (2006.01)
*C10L 1/224* (2006.01)
*C10L 1/226* (2006.01)

(52) U.S. Cl. ............... 507/90; 507/128; 507/129; 507/131; 507/133; 507/136; 507/235; 507/240; 507/241; 507/244; 507/246; 507/939; 44/419; 44/422; 252/392; 585/15; 585/950

(58) Field of Classification Search ............ 585/15, 585/950; 507/90, 240, 244, 245, 246, 131, 507/241
See application file for complete search history.

(56) References Cited

U.S. PATENT DOCUMENTS

| 3,054,750 | A | * | 9/1962 | Jolly ..................... 507/244 |
|---|---|---|---|---|
| 5,135,668 | A | | 8/1992 | Larsen |
| 5,244,878 | A | | 9/1993 | Sugier et al. |
| 5,331,105 | A | | 7/1994 | Duncum et al. |
| 5,434,323 | A | | 7/1995 | Durand et al. |
| 5,460,728 | A | | 10/1995 | Klomp et al. |
| 5,491,269 | A | | 2/1996 | Colle et al. |
| 5,639,925 | A | | 6/1997 | Sloan et al. |
| 5,648,575 | A | | 7/1997 | Klomp et al. |
| 5,741,758 | A | | 4/1998 | Pakulski |

(Continued)

FOREIGN PATENT DOCUMENTS

EP 0 309 210 A1 3/1989

(Continued)

*Primary Examiner*—Randy Gulakowski
*Assistant Examiner*—John J Figueroa
(74) *Attorney, Agent, or Firm*—Jeffrey L. Streets; Streets & Steele

(57) ABSTRACT

A method and an amide composition used therein for inhibiting, retarding, mitigating, reducing, controlling and/or delaying formation of hydrocarbon hydrates or agglomerates of hydrates. The method may be applied to prevent or reduce or mitigate plugging of conduits, pipes, transfer lines, valves, and other places or equipment where hydrocarbon hydrate solids may form under the conditions. At least one amide compound is added into the process stream, where the compound may be mixed with another compound selected from amino alcohols, esters, quaternary ammonium, phosphonium or sulphonium salts, betaines, amine oxides, other amides, simple amine salts, and combinations thereof.

22 Claims, 11 Drawing Sheets

U.S. PATENT DOCUMENTS

| | | |
|---|---|---|
| 5,744,665 A | 4/1998 | Costello et al. |
| 5,874,660 A | 2/1999 | Colle et al. |
| 5,879,561 A | 3/1999 | Klomp et al. |
| 5,958,844 A | 9/1999 | Sinquin et al. |
| 6,015,929 A | 1/2000 | Rabeony et al. |
| 6,025,302 A | 2/2000 | Pakulski |
| 6,035,933 A | 3/2000 | Khalil et al. |
| 6,063,972 A | 5/2000 | Duncum et al. |
| 6,102,986 A | 8/2000 | Klug |
| 6,152,993 A | 11/2000 | Klomp |
| 6,177,497 B1 | 1/2001 | Klug et al. |
| 6,180,699 B1 | 1/2001 | Bakeev et al. |
| 6,214,091 B1 | 4/2001 | Klomp |
| 6,331,508 B1 | 12/2001 | Pakulski |
| 6,369,004 B1 | 4/2002 | Klug et al. |
| 6,379,294 B1 | 4/2002 | Buijs et al. |
| 6,436,877 B1 | 8/2002 | Duncum et al. |
| 6,444,852 B1* | 9/2002 | Milburn et al. ............ 564/292 |
| 6,544,932 B2 | 4/2003 | Klug et al. |
| 6,566,309 B1 | 5/2003 | Klug et al. |
| 6,596,911 B2 | 7/2003 | Przybylinski et al. |
| 6,620,330 B2 | 9/2003 | Rivers et al. |
| 6,867,262 B1 | 3/2005 | Angel et al. |
| 6,894,007 B2 | 5/2005 | Klug et al. |
| 6,905,605 B2 | 6/2005 | Klomp |
| 7,183,240 B2* | 2/2007 | Dahlmann et al. .......... 507/240 |
| 2002/0038063 A1* | 3/2002 | Przybylinski et al. .......... 585/2 |
| 2004/0163307 A1 | 8/2004 | Dahlmann et al. |
| 2004/0164278 A1 | 8/2004 | Dahlmann et al. |
| 2004/0167040 A1 | 8/2004 | Dahlmann et al. |
| 2005/0101495 A1 | 5/2005 | Dahlmann et al. |

FOREIGN PATENT DOCUMENTS

| | | |
|---|---|---|
| WO | WO 93/25798 | 12/1993 |
| WO | WO 94/24413 | 10/1994 |
| WO | WO 95/17579 | 6/1995 |
| WO | WO 95/19408 | 7/1995 |
| WO | WO 96/04462 | 2/1996 |
| WO | WO 96/29502 | 9/1996 |
| WO | WO 96/34177 | 10/1996 |
| WO | WO 98/23843 | 6/1998 |

* cited by examiner

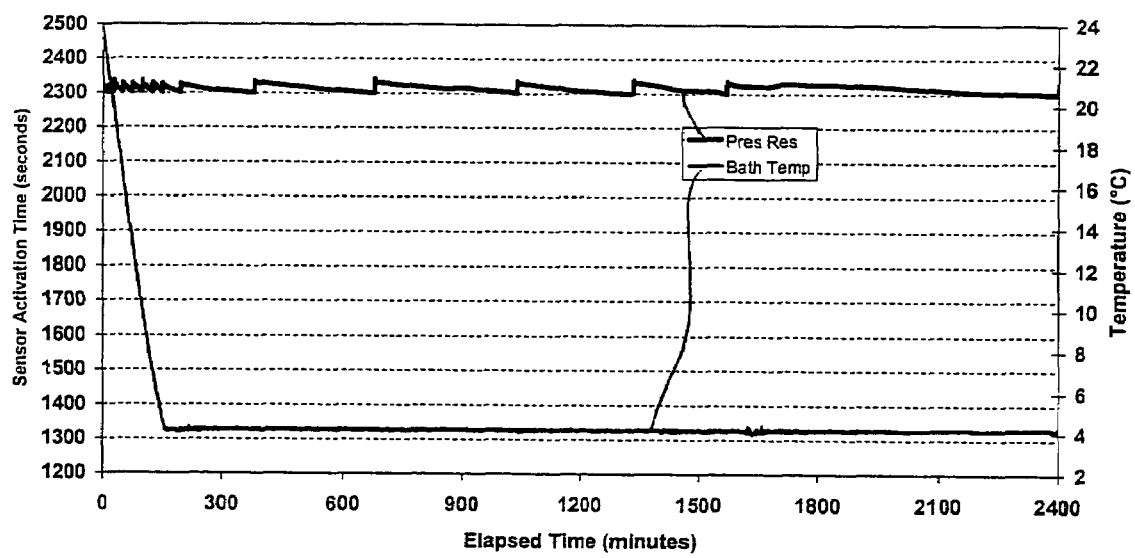
Figure 1: Temperature - PressureProfile

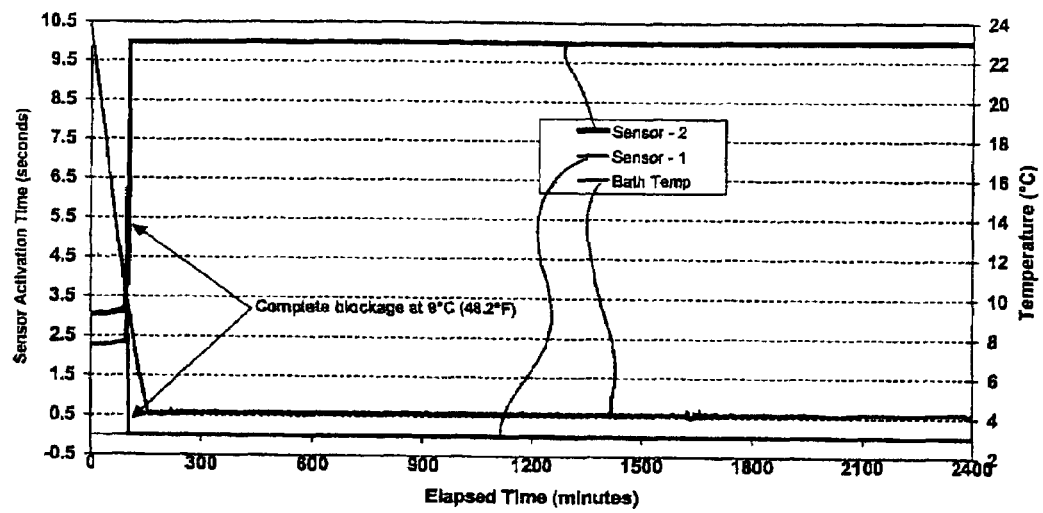
Figure 2: Untreated Sample
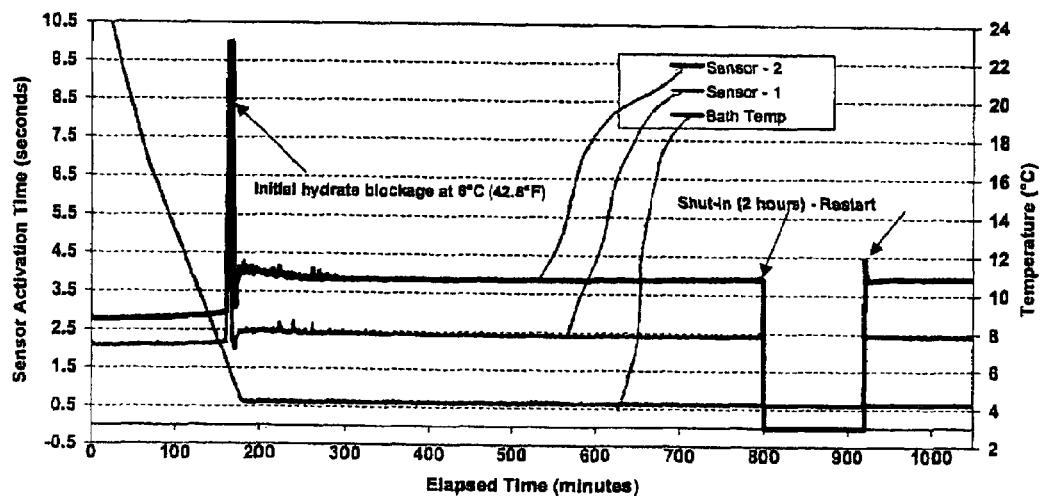
Figure 3: 3% Trimethylhexadecylammonium Bromide Figure 4: 3% Dimethylethylhexadecylammonium Bromide
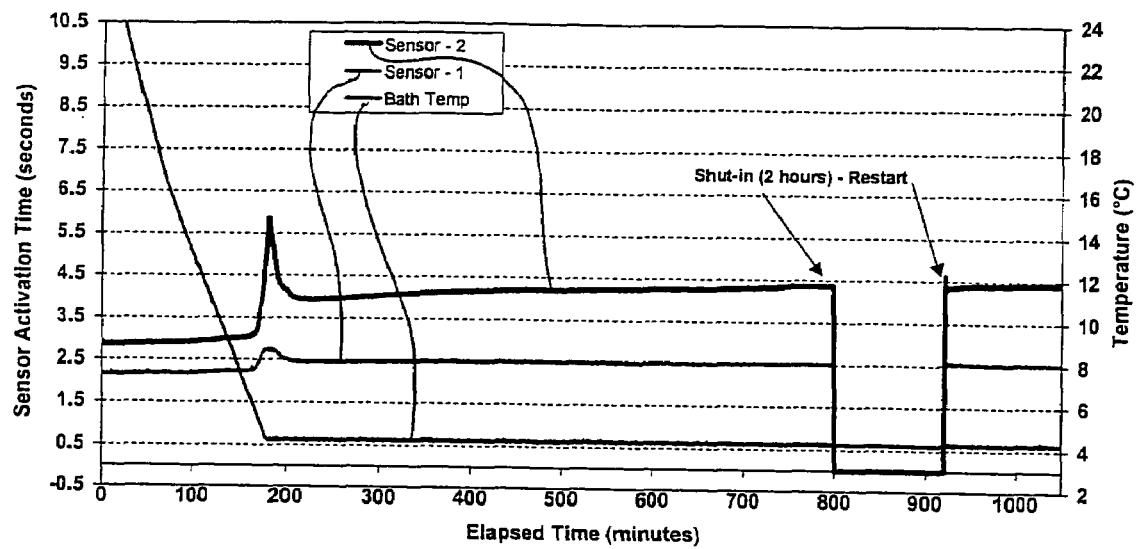
Figure 5: 3% Dimethylbutylhexadecylammonium Bromide
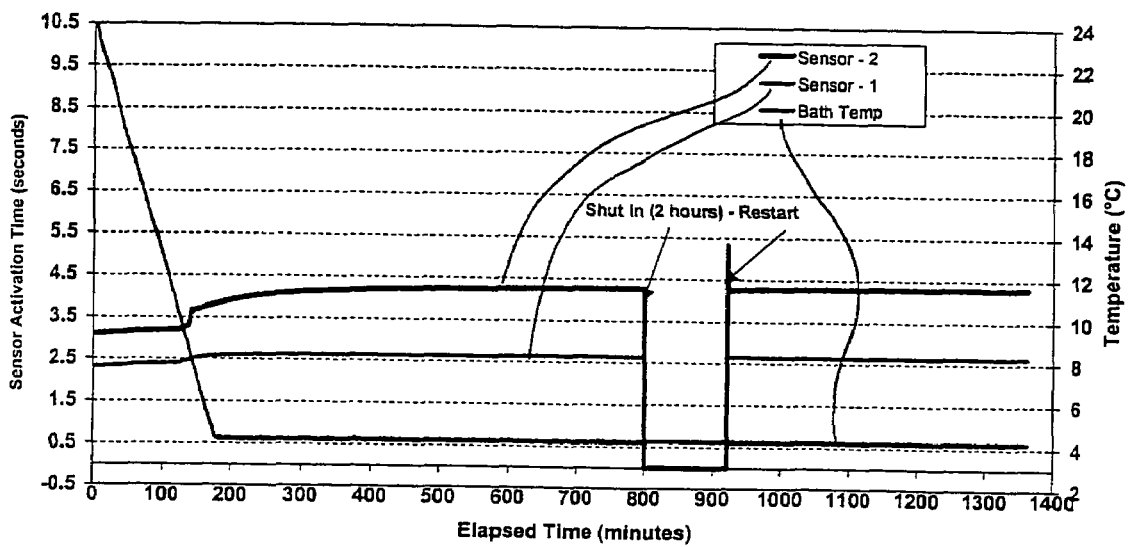

Figure 6: 3% Dimethylbutyloctadecylammonium Bromide
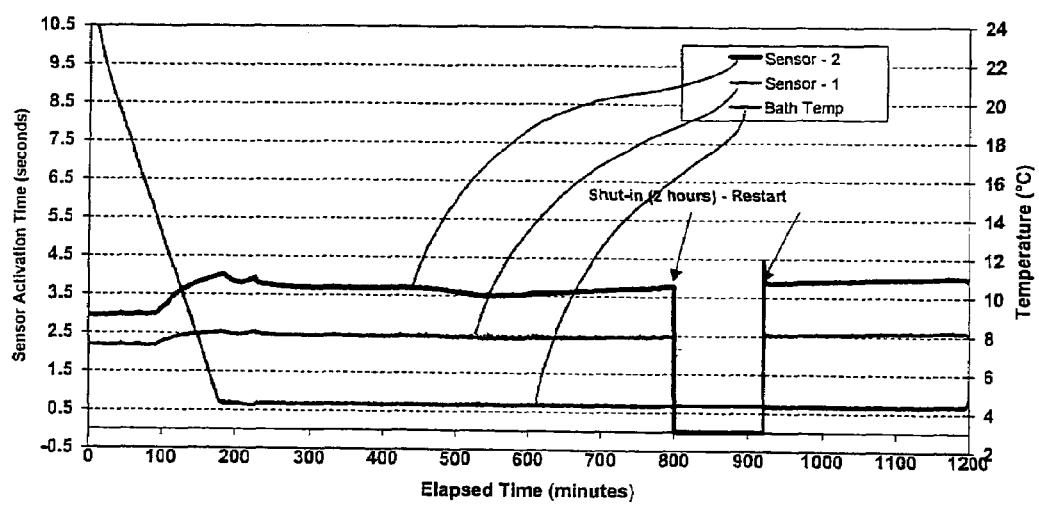
Figure 7: 3% Dipropylbutylhexadecylammonium Bromide
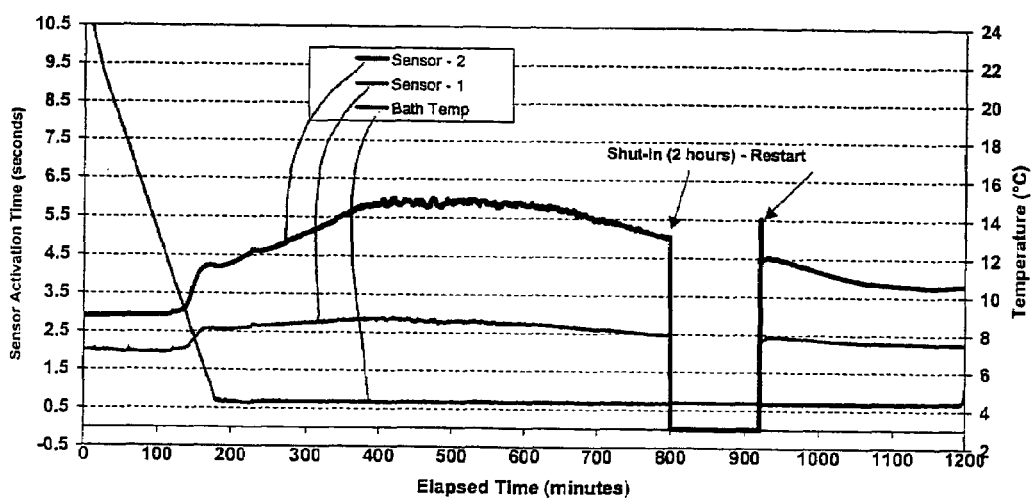

Figure 8: 3.0%Dibutylpropylhexadecylammonium Bromide
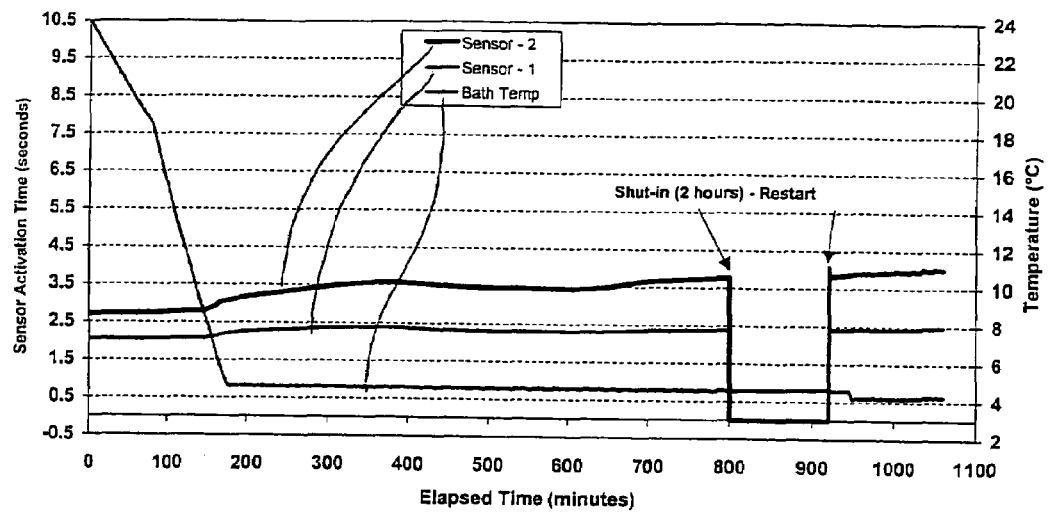
Figure 9a: 3.0% Tributylhexadecylammonium Bromide
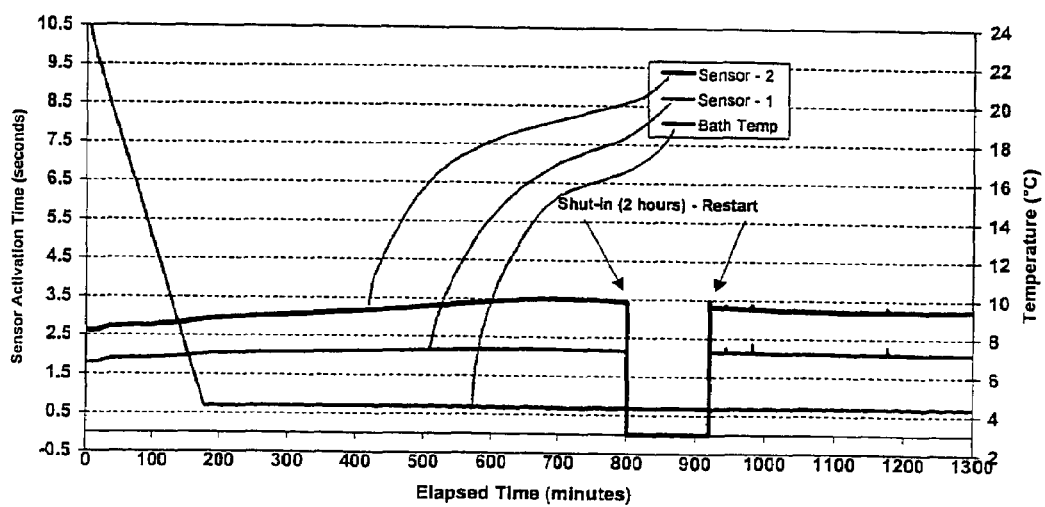

Figure 9b: 1.0% Tributylhexadecylammonium Bromide
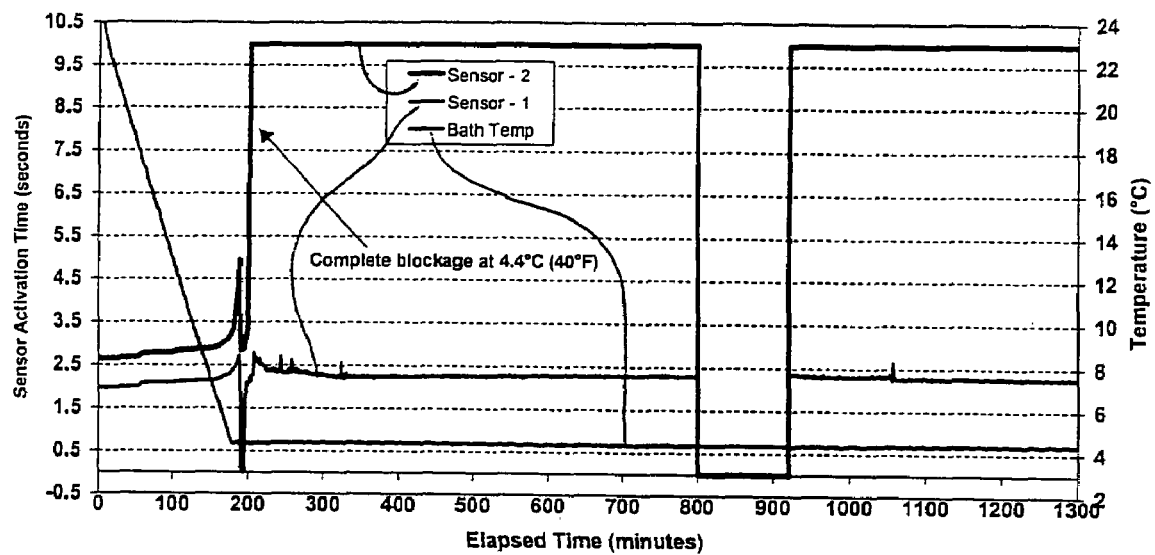
Figure 10: 3.0% Dimethyldihexadecylammonium Bromide
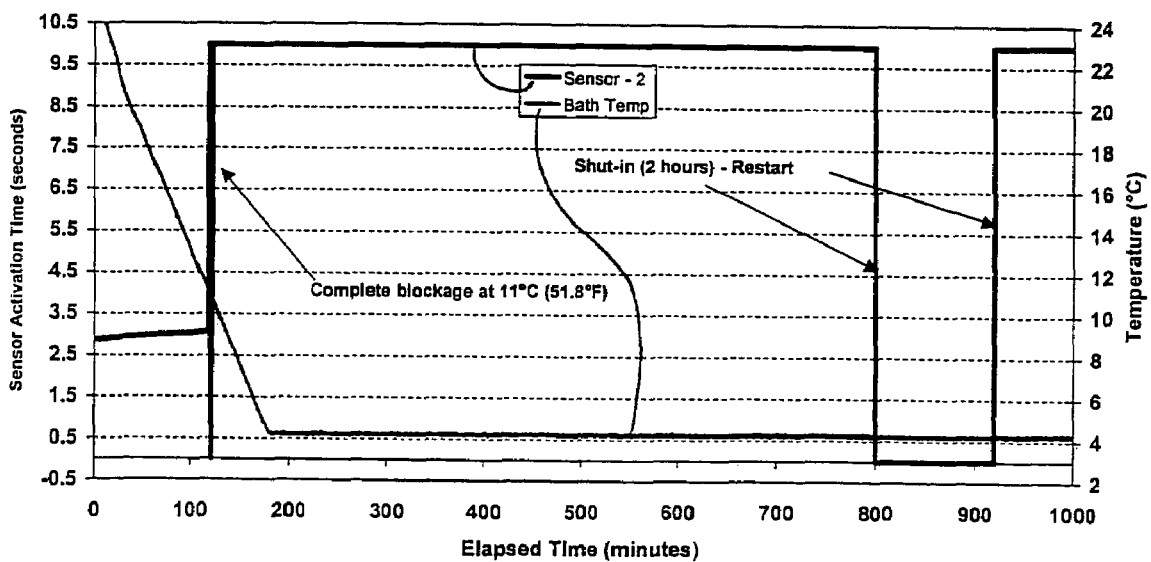

Figure 11: 3.0% N,N-Dibutyl-cocoamidopropyl Carbomethoxy Betaine
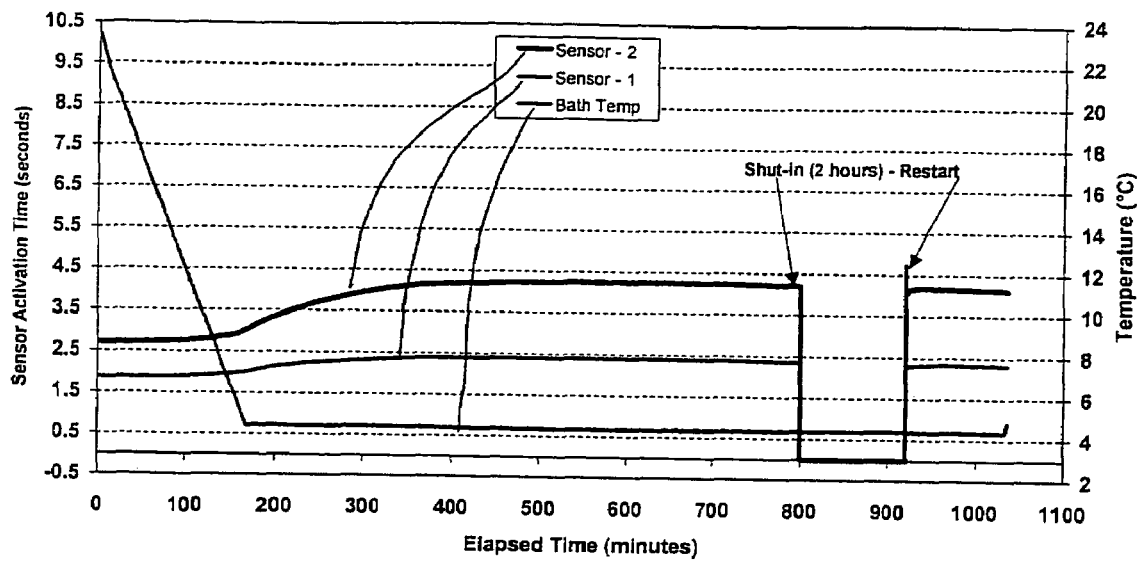
Figure 12: 3.0% N,N-Dibutylamino-cocoamidopropylamine Oxide
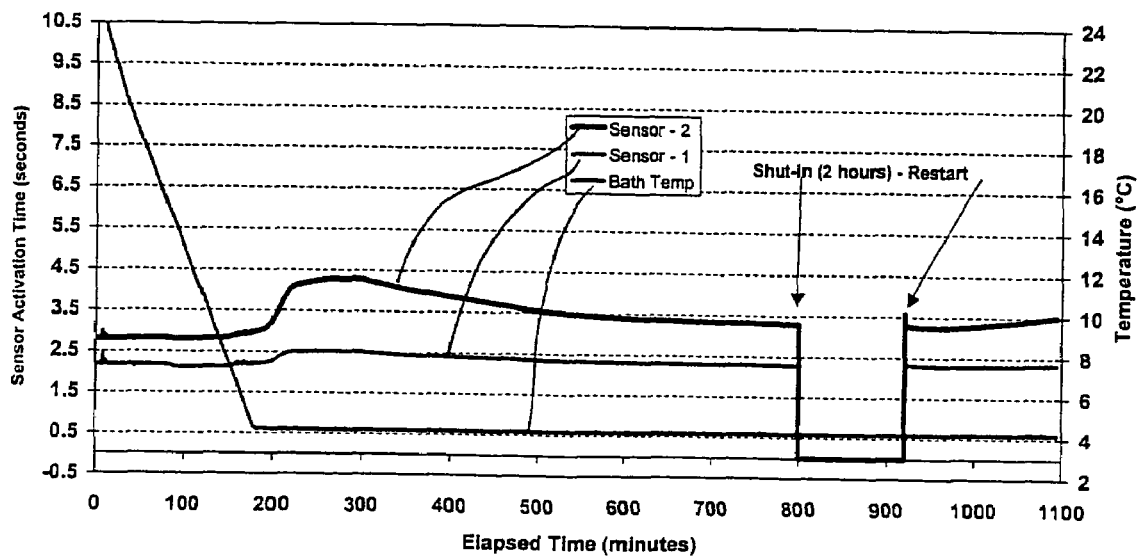

Figure 13: 3.0% N,N,N-Tributyl-cocoamidopropylammonium Bromide
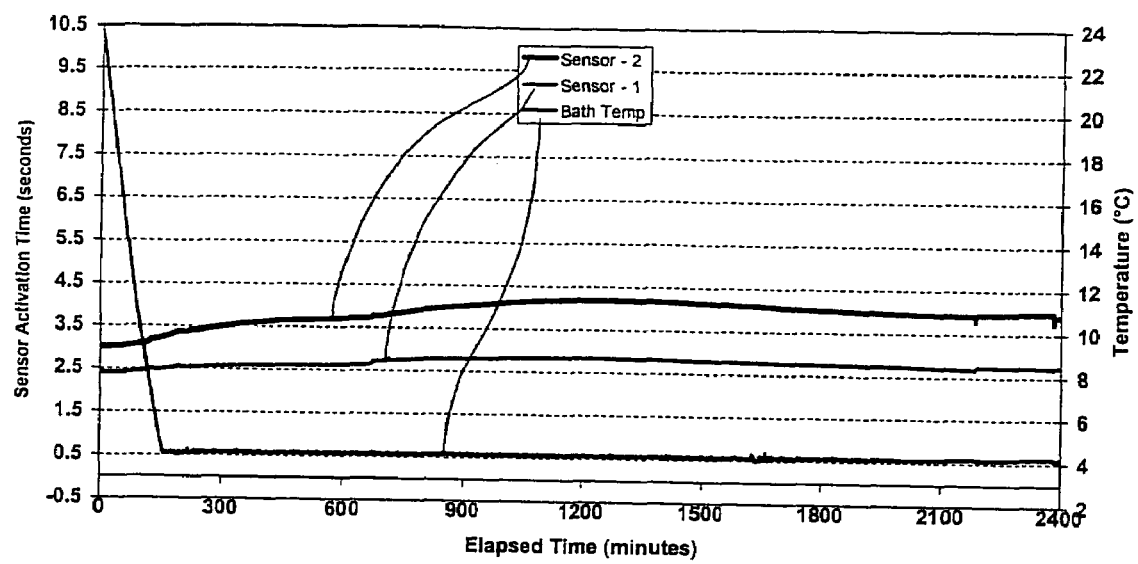
Figure 14: 3.0% N,N-Dibutylhexadecyl-cocamidopropylammonium Bromide
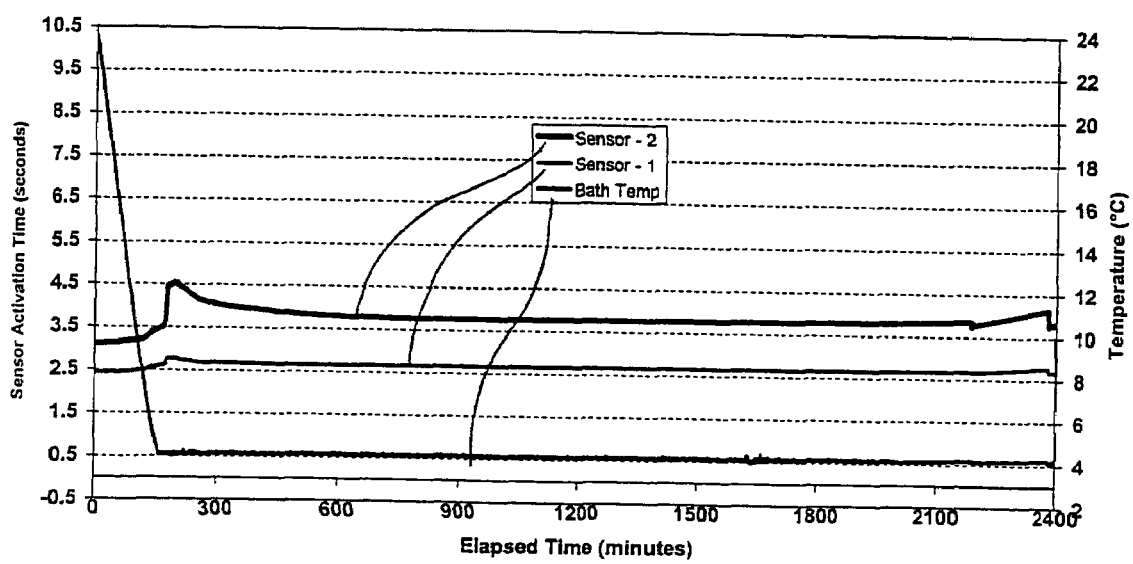

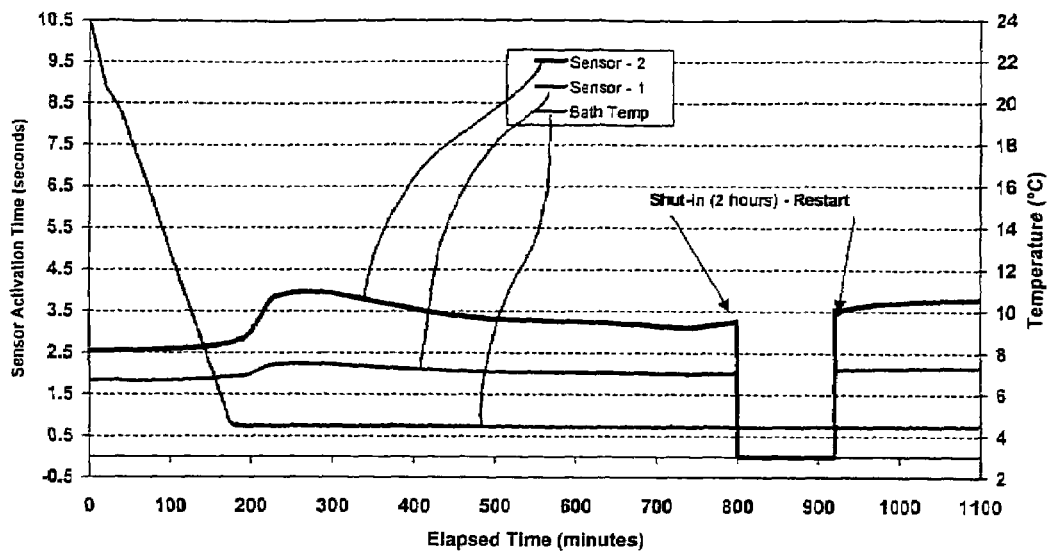
Figure 15a: 3.0% N,N-Dibutylhexadecyltriethoxyammonium Bromide
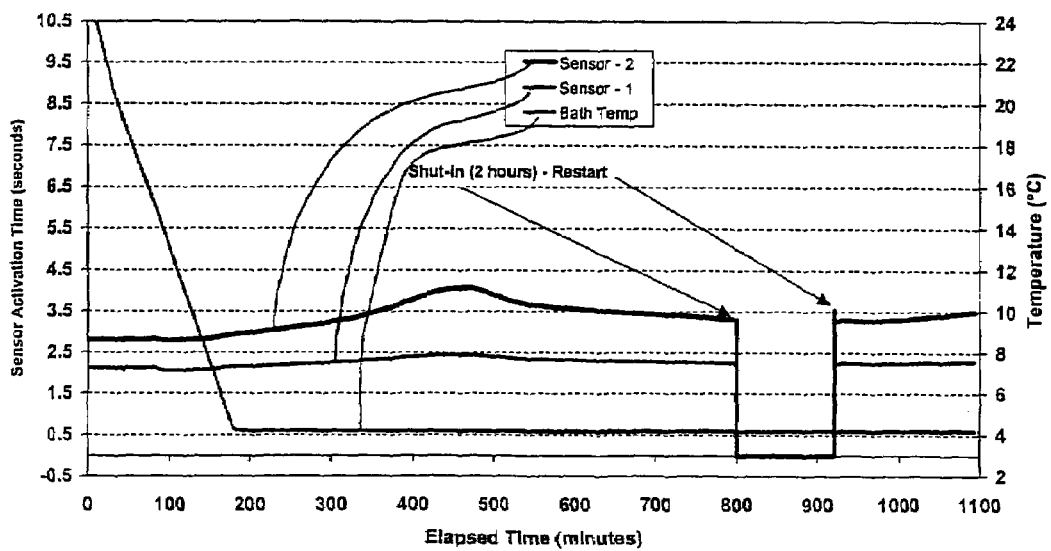
Figure 15b: 1.0% N,N-Dibutylhexadecyltriethoxyammonium Bromide Figure 16a: 3.0% Tributylhexadecylphosphonium Bromide
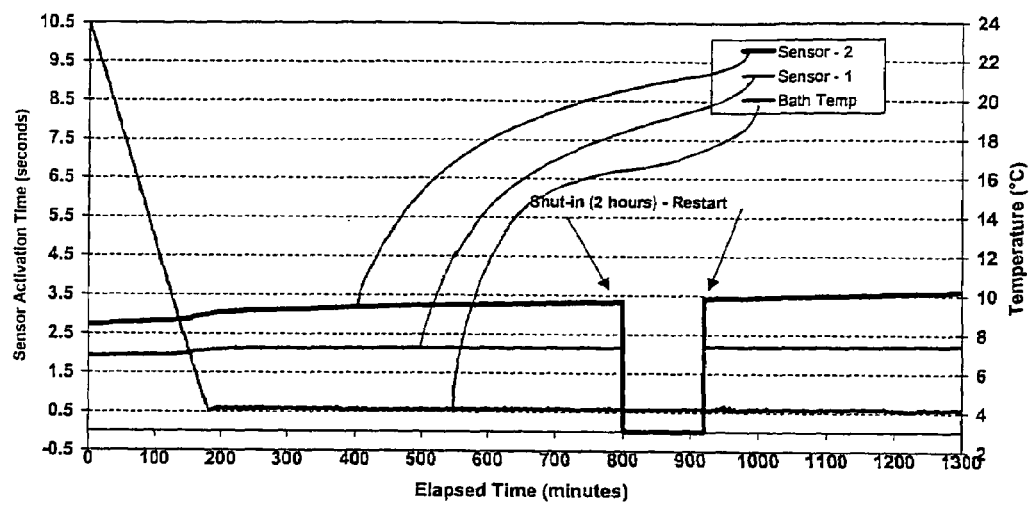
Figure 16b: 1.0% Tributylhexadecylphosphonium Bromide
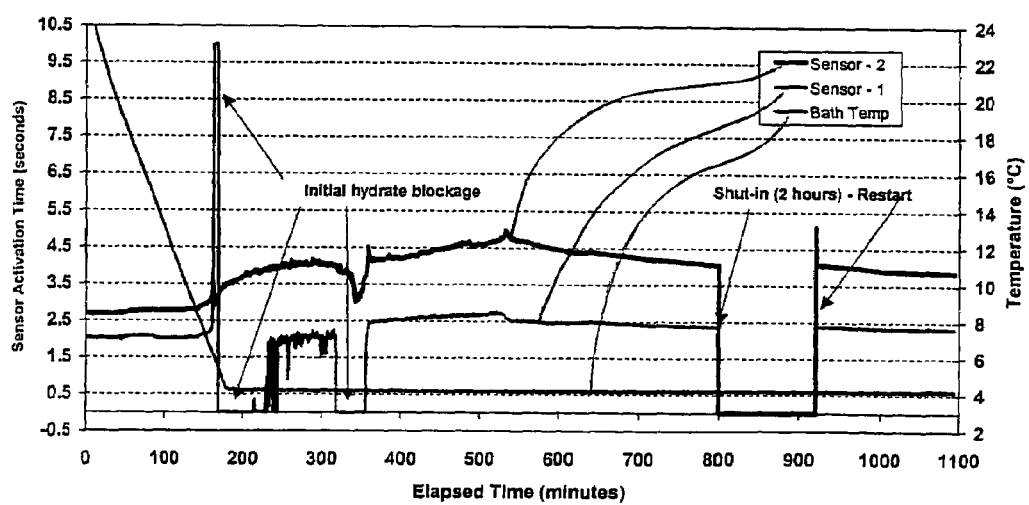

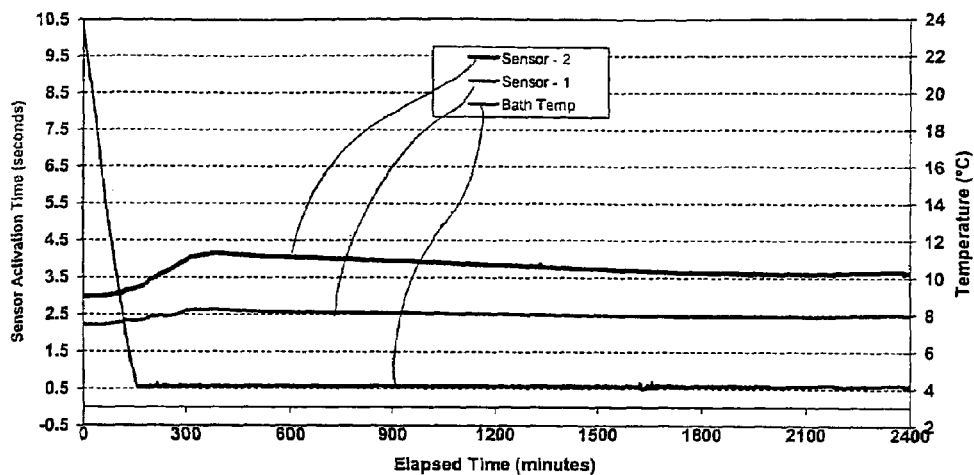
Figure 17a: 3.0% N,N-Dibutyl-cocoamidopropyl Carboethoxy Betaine and Amine Salt
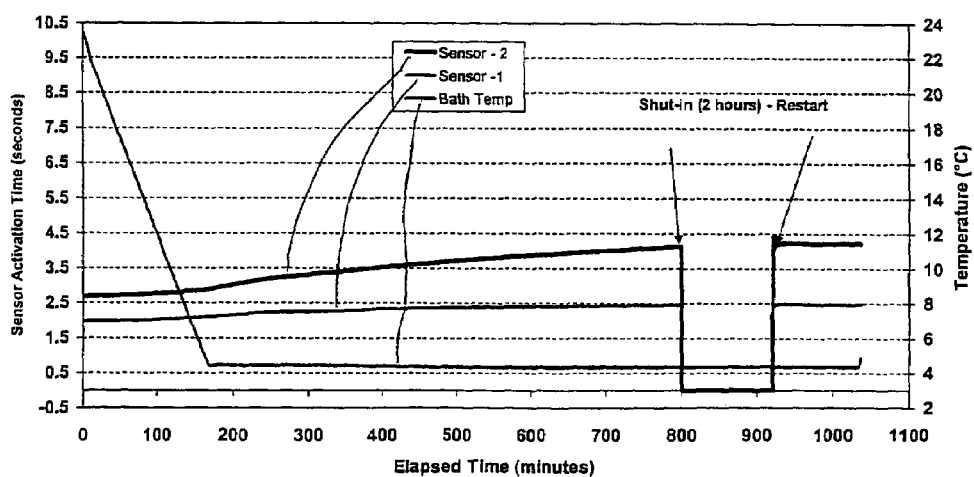
Figure 17b: 1.0% N,N-Dibutyl-cocoamidopropyl Carboethoxy Betaine and Amine Salt

METHODS FOR INHIBITING HYDRATE BLOCKAGE IN OIL AND GAS PIPELINES USING AMIDE COMPOUNDS

This application claims priority of U.S. provisional patent application 60/513,311 filed on Oct. 21, 2003.

BACKGROUND OF THE INVENTION

1. Field of the Invention

This invention relates to the prevention of gas hydrate blockage in oil and natural gas pipelines containing low-boiling hydrocarbons and water. More specifically, the invention relates to a method of controlling gas hydrate blockage through the addition of various chemical compositions.

2. Background of the Related Art

When hydrocarbon gas molecules dissolve in water, the hydrogen-bonded network of water molecules encapsulates the gas molecules to form a cage-like structure or hydrate. Higher pressures and lower temperatures foster the formation of these structures. These hydrates grow by encapsulating more and more gaseous molecules to form a crystalline mass. The crystalline mass agglomerates to form a larger mass that can result in a plugged transmission line. The hydrocarbon gases that form the majority of the hydrates include methane, ethane, propane, n-butane, iso-butane, n-pentane, iso-pentane, and combinations of these gases.

Thermodynamic hydrate inhibitors, such as methanol or one of the glycols, have traditionally been used to prevent these hydrate formations. These thermodynamic inhibitors are effective at 5-30% (or higher) based on the amount of water. As oil companies are exploring new production in deep waters, the total gas/oil/water productions are also increasing. The use of these thermodynamic inhibitors is not viable in these applications due to logistics.

Kinetic hydrate inhibitors have been identified to prevent these hydrate formations so that the fluids can be pumped out before a catastrophic hydrate formation occurs. The kinetic inhibitors prevent or delay hydrate crystal nucleation and disrupt crystal growth. These kinetic hydrate inhibitors contain moieties similar to gas molecules previously mentioned. It is suspected that these kinetic inhibitors prevent hydrate crystal growth by becoming incorporated into the growing hydrate crystals, thereby disrupting further hydrate crystal growth. The growing hydrate crystals complete a cage by combining with the partial hydrate-like cages around the kinetic hydrate inhibitor moieties containing gas-like groups. These inhibitors are effective with or without the presence of a liquid hydrocarbon phase, but they are typically less effective in preventing the hydrate formation as the production pressure increases. Examples of kinetic hydrate inhibitors include poly(N-methylacrylamide), poly(N,N-dimethylacrylamide), poly(N-ethylacrylamide), poly(N,N-diethylacrylamide), poly(N-methyl-N-vinylacetamide), poly(2-ethyloxazoline), poly(N-vinylpyrrolidone), and poly(N-vinylcaprolactam).

Unlike the kinetic hydrate inhibitors, anti-agglomerate hydrate inhibitors are effective only in the presence of an oil phase. These inhibitors do not inhibit the formation of gas hydrates to the same level as kinetic inhibitors, rather their primary activity is in preventing the agglomeration of hydrate crystals. The oil phase provides a transport medium for the hydrates which are referred to as hydrate slurries so that the overall viscosity of the medium is kept low and can be transported along the pipeline. As such, the hydrate crystals formed in the water-droplets are prevented from agglomerating into a larger crystalline mass.

Examples of several chemicals acting as anti-agglomerate hydrate inhibitors have been reported in U.S. Pat. Nos. 5,460,728; 5,648,575; 5,879,561; and 6,596,911. These patents teach the use of quaternary ammonium salts having at least three alkyl groups with four or five carbon atoms and a long chain hydrocarbon group containing 8-20 atoms. Exemplary compositions include tributylhexadecylphosphonium bromide and tributylhexadecylammonium bromide.

More specifically, Klomp (U.S. Pat. No. 5,460,728) teaches the use of alkylated ammonium, phosphonium or sulphonium compounds having three or four alkyl groups in their molecule, at least three of which are independently chosen from the group of normal or branched alkyls having four to six carbon atoms. Klomp (U.S. Pat. No. 5,648,575) teaches very similar compositions having three or four organic groups in their molecule, at least three of which have at least four carbon atoms, i.e., two normal or branched alkyl groups having at least four carbon atoms and with a further organic moiety containing a chain of at least four carbon atoms. Klomp (U.S. Pat. No. 5,879,561) teaches the use of alkylated ammonium or phosphonium compounds having four alkyl groups, two of which are independently normal or branched alkyls having four or five carbon atoms and two more of which independently represent organic moieties having at least eight carbon atoms.

Klug (U.S. Pat. No. 6,369,004 B1) teaches the kinetic inhibition of gas hydrate formation using polymers based on reacting maleic anhydride with one or more amines. These polymers can also be used together with various other substances, called synergists, including tetrabutylammonium salts, tetrapentylammonium salts, tributylamine oxide, tripentylamine oxide, zwitterionic compounds having at least one butyl or pentyl group on the quaternary ammonium nitrogen atom, such as as $Bu_3N^+-CH_2-COO^-$. However, kinetic inhibitors are not effective as the pipeline pressure increases.

Rabeony (U.S. Pat. No. 6,015,929) teaches the use of specific zwitterionic compounds such as $R(CH_3)_2N^+-(CH_2)_4-SO_3^-$ as anti-agglomerate hydrate inhibitors. The synthesis of this product involves the use of butyl sultone.

However, there remains a need for hydrate inhibitor compounds that effectively prevent agglomeration of hydrates in oil and gas transportation and handling processes. It would be desirable to identify hydrate inhibitor compounds that are effective at higher pressures and/or lower temperatures such as those encounter in deep water production. It would be even more desirable if the same compounds had increased biodegradability.

SUMMARY OF THE INVENTION

Further still, the method may include adding to the mixture an effective amount of at least one amide compound having a formula:

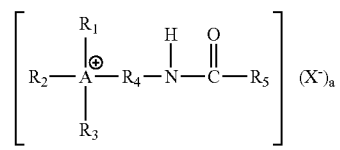

where: $R_1$, $R_2$, $R_4$, and $R_5$ are organic moieties; $R_1$ is an alkyl having from 4 to 5 carbon atoms; $R_2$ is hydrogen or an alkyl having from 1 to 4 carbon atoms; $R_4$ is selected from —$(CH_2)_t$-, —$[CH_2$—$CHR_6)_t]$-, —$(CH_2$—$CHR_6O)_u$—$(CH_2)_t$— an is an integer 2 to 4, u is 0 or an integer (1 or greater) and $R_6$ is hydrogen or an alkyl having from 1 to 3 carbon atoms; $R_5$ is an organic moiety, for example an alkyl or alkenyl group, having 4 to 20 carbon atoms; A is N or P; $X^-$ is an anion; and a is 0 or 1. When a is 0, then $R_3$ is selected from —$[(CH_2)(CHR_6)_b(C=O)]_c$—$O^-$, —$[(CH_2CH_2)$—$(SO_2)]$—$_O^-$,—$[(CH_2CH(OH)CH_2)$—$(SO_2)]$—$O^-$, —$[(CH_2)_n$—$(C=S)]$—$S^-$ and combinat is 0 or 1, c is 0 or 1, and $R_6$ is selected from hydrogen and methyl. When a is 1, then $R_3$ is selected from hydrogen, organic moieties having from 1 to 20 carbon atoms, and combinations thereof. Preferably, $R_3$ is the same as the group containing the amide functionality.

The $X^-$ anion is preferably selected from hydroxide, carboxylate, halide, sulphate, organic sulphonate, and combinations thereof. Suitable halide ions include, without limitation, bromide, chloride, and combinations thereof.

In one embodiment, $R_3$ is hydrogen, a is 1, and the anion $X^-$ is selected from hydroxide, carboxylate, halide, sulphate, organic sulphonate, and combinations thereof. In a still further embodiment, the at least one amide compound is the reaction product of an N,N-dialkyl-aminoalkylamine with an ester or glyceride. Preferably, the ester or glyceride is derived from a plant source or an animal source, selected from coconut oil, tallow oil, vegetable oil, and combinations thereof.

The method may further comprise adding at least one amine salt to the mixture along with the at least one compound. Suitable amine salts include those previously described herein. Furthermore, the at least one compound may be mixed with the solvents previously described herein.

In another embodiment, the at least one compound includes a product prepared by the reaction of an amine selected from (3-dialkylamino)propylamine and (3-dialkylamino)ethylamine with vegetable oil or tallow oil followed by reacting with a reactant selected from an organic halide, such as an alkyl halide, having from 4 to 20 carbon atoms, hydrogen peroxide, and an acid, wherein the acid is selected from mineral acids, formic acid, acetic acid, chloroacetic acid, propionic acid, acrylic acid, and methacrylic acid, and wherein the dialkyl of the (3-dialkylamino)propylamine includes two alkyl groups independently selected from methyl, ethyl, propyl, butyl, morpholine, piperidine, and combinations thereof.

BRIEF DESCRIPTION OF THE DRAWINGS

FIG. 1 is a graph of a temperature and pressure profile used in FIGS. 3-17.

FIG. 2 is a graph of sensor activation time (a measure of hydrate formation and blockage ) as a function of time for an untreated mixture of hydrocarbon and water.

FIG. 3 is a graph of sensor activation time (a measure of hydrate formation and blockage) as a function of time for a mixture of hydrocarbon and water treated with 3% trimethylhexadecylammonium bromide.

FIG. 4 is a graph of sensor activation time (a measure of hydrate formation and blockage) as a function of time for a mixture of hydrocarbon and water treated with 3% dimethylethylhexadecylammonium bromide FIG. 5 is a graph of sensor activation time (a measure of hydrate formation and blockage) as a function of time for a mixture of hydrocarbon and water treated with 3% dimethylbutylhexadecylammonium bromide.

FIG. 6 is a graph of sensor activation time (a measure of hydrate formation and blockage) as a function of time for a mixture of hydrocarbon and water treated with 3% dimethylbutyloctadecylammonium bromide.

FIG. 7 is a graph of sensor activation time (a measure of hydrate formation and blockage) as a function of time for a mixture of hydrocarbon and water treated with 3% dipropylbutylhexadecylammonium bromide.

FIG. 8 is a graph of sensor activation time (a measure of hydrate formation and blockage) as a function of time for a mixture of hydrocarbon and water treated with 3% dibutylpropylhexadecylammonium bromide.

FIGS. 9a and 9b are graphs of sensor activation time (a measure of hydrate formation or blockage) as a function of time for a mixture of hydrocarbon and water treated with 3% and 1% tributylhexadecylammonium bromide, respectively.

FIG. 10 is a graph of sensor activation time (a measure of hydrate formation and blockage) as a function of time for a mixture of hydrocarbon and water treated with 3% dimethyldihexadecylammonium bromide.

FIG. 11 is a graph of sensor activation time (a measure of hydrate formation and blockage) as a function of time for a mixture of hydrocarbon and water treated with 3% N,N-dibutyl-cocoamidopropyl carbomethoxy betaine.

FIG. 12 is a graph of sensor activation time (a measure of hydrate formation and blockage) as a function of time for a mixture of hydrocarbon and water treated with 3% N,N-dibutylamino-cocoamidopropylamine oxide.

FIG. 13 is a graph of sensor activation time (a measure of hydrate formation and blockage) as a function of time for a mixture of hydrocarbon and water treated with 3% N,N,N-tributyl-cocoamidopropylammonium bromide.

FIG. 14 is a graph of sensor activation time (a measure of hydrate formation and blockage) as a function of time for a mixture of hydrocarbon and water treated with 3% N,N-dibutylhexadecyl-cocoamidopropylammonium bromide.

FIGS. 15a and 15b are graphs of sensor activation time (a measure of hydrate formation and blockage) as a function of time for a mixture of hydrocarbon and water treated with 3% and 1% N,N-dibutylhexadecyltriethoxyammonium bromide, respectively.

FIGS. 16a and 16b are graphs of sensor activation time (a measure of hydrate formation and blockage) as a function of time for a mixture of hydrocarbon and water treated with 3% and 1% tributylhexadecylphosphonium bromide, respectively.

FIGS. 17a and 17b are graphs of sensor activation time (a measure of hydrate formation and blockage) as a function of time for a mixture of hydrocarbon and water treated with 3% and 1%, respectively, of a blend of N,N-dibutyl-cocoamidopropyl carboethoxy betaine and amine salt.

DETAILED DESCRIPTION OF PREFERRED EMBODIMENTS

This invention relates a method and a composition used therein for inhibiting, retarding, mitigating, reducing, controlling and/or delaying formation of hydrocarbon hydrates or agglomerates of hydrates. The method may be applied to prevent or reduce or mitigate plugging of conduits, pipes, transfer lines, valves, and other places or equipment where hydrocarbon hydrate solids may form under the conditions.

The term "inhibiting" is used herein in a broad and general sense to mean any improvement in preventing, controlling, delaying, reducing or mitigating the formation, growth and/or agglomeration of hydrocarbon hydrates, particularly light hydrocarbon gas hydrates in any manner, including, but not limited to kinetically, thermodynamically, by dissolution, by breaking up, other mechanisms, or any combinations thereof.

The term "formation" or "forming" relating to hydrates is used herein in a broad and general manner to include, but are not limited to, any formation of hydrate solids from water and hydrocarbon(s) or hydrocarbon gas(es), growth of hydrocarbon hydrate solids, agglomeration of hydrocarbon hydrates, accumulation of hydrocarbon hydrates on surfaces, any deterioration of hydrate solids plugging or other problems in a system and combinations thereof.

The present method is useful for inhibiting hydrate formation for many hydrocarbons and hydrocarbon mixtures. The method is particularly useful for lighter or low-boiling, $C_1$-$C_5$, hydrocarbon gases or gas mixtures at ambient conditions. Non-limiting examples of such "low-boiling" gases include methane, ethane, propane, n-butane, isobutane, isopentane and mixtures thereof. Other examples include various natural gas mixtures that are present in many gas and/or oil formations and natural gas liquids (NGL). The hydrates of all of these low-boiling hydrocarbons are also referred to as gas hydrates. The hydrocarbons may also comprise other compounds including, but not limited to $CO_2$, hydrogen sulfide, and other compounds commonly found in gas/oil formations or processing plants, either naturally occurring or used in recovering/processing hydrocarbons from the formation or both, and mixtures thereof.

The method of the present invention involves contacting a hydrocarbon and water mixture with a suitable compound or composition. When an effective amount of the compound is used, hydrate blockage is prevented. In the absence of such effective amount, hydrate blockage is not prevented.

The contacting may be achieved by a number ways, including mixing, blending with mechanical mixing equipment or devices, stationary mixing setup or equipment, magnetic mixing or other suitable methods, other equipment and means known to one skilled in the art and combinations thereof to provide adequate contact and/or dispersion of the composition in the mixture. The contacting can be made in-line or offline or both. The various components of the composition may be mixed prior to or during contact, or both. As discussed, if needed or desired, the composition or some of its components may be optionally removed or separated mechanically, chemically, or by other methods known to one skilled in the art, or by a combination of these methods after the hydrate formation conditions are no longer present.

Because the present invention is particularly suitable for lower boiling hydrocarbons or hydrocarbon gases at ambient conditions, the pressure of the condition is usually at or greater than atmospheric pressure. (i.e. about 101 kPa), preferably greater than about 1 MPa, and more preferably greater than about 5 MPa. The pressure in certain formation or processing plants or units could be much higher, say greater than about 20 MPa. There is no specific high-pressure limit. The present method can be used at any pressure that allows formation of hydrocarbon gas hydrates.

The temperature of the condition for contacting is usually below, the same as, or not much higher than the ambient or room temperature. Lower temperatures tend to favor hydrate formation, thus requiring the treatment with the composition of the present invention. At much higher temperatures, however, hydrocarbon hydrates are less likely to form, thus obviating the need of carrying out any treatments.

The ammonium, phosphonium, and sulphonium compounds of the present invention may also be connected through one of the organic side chains, such as represented by —$R_4$, to become a pendent group of many oxygen-containing polymers. Such polymers include, but not limited to polyacrylate, polymethacrylate, copolymers of acrylate and methacrylate, polyacrylamide, polymethacrylamide, copolymers of acrylamide and methacrylamide, and polymers and copolymers of N-vinylcaprctam.

The ammonium, phosphonium, and sulphonium compounds of the present invention may also be connected through one of the organic side chains, such as represented by —$R_4$, to become a pendent group of nitrogen containing polymers, where the nitrogen is on the polymer backbone. Such nitrogen containing polymers and copolymers can be obtained by the Michael addition reaction between polyethylenimine and acrylic or methacrylic acids. The copolymers may also include N-vinylcaprolactam, N,N-dimethylacrylamide, N-ethylacrylamide, N-isopropylacrylamide, N-butylacrylamide, or N-tert. butylacrylamide. The suitable onium compounds can be attached through the acid moiety using suitable diamino or aminoalcoholic chemicals followed by the salt forming reactions.

Based on the total weight of the composition, the concentration of the onium compound in a solvent should be in the range from about 5 wt % to about 75 wt %, preferably from about 10 wt % to about 65 wt %.

In addition to the ammonium, phosphonium and sulphonium compounds, the composition may also include liquids. These liquids are generally solvents for the virgin solid form of the compounds. Such solvents include, but are not limited to, water, simple alcohols like methanol, ethanol, iso-propanol, n-butanol, iso-butanol, 2-ethyl hexanol; glycols like ethylene glycol, 1,2-propylene glycols, 1,3-propylene glycol, and hexylene glycol; ether solvents like ethylene glycol mono butylether (butyl cellosolve), ethylene glycol dibutyl ether, and tetrahydrofuran; ketonic solvents like methylethylketone, diisobutylketone, N-methylpyrrolidone, cyclohexanone; armatic hydrocarbon solvents like xylene and toluene; and mixtures thereof. The selection of the suitable solvent or combination of solvents are important to maintain a stable solution of the compounds during storage and to provide stability and reduced viscosity for the inhibitor solutions when they are injected against a pressure of 200 to 25,000 psi. The solvent is present in the inhibitor composition in the range from 0% to about 95%, preferably from 20% to about 95%, more preferably from 50% to about 95% of the total composition, based on volume.

When the compounds of the present invention are added into the mixture of hydrocarbons and water at any concentration effective to inhibit the formation of hydrates under the given conditions. Preferably, the concentration of the active inhibitor compound is between about 0.01 wt % and about 5 wt % based on the water content. More preferably, the inhibitor compound concentration is between about 0.1 wt % and about 3 wt %.

The present invention may also be used in combination with other means of hydrate inhibition such as the use of thermodynamic or kinetic inhibitors discussed in the background section. These other hydrate inhibitors may be of the same or different type of hydrate inhibitor used in the composition. If mixtures of hydrate inhibitors are used, the mixture may be added to the hydrocarbon and water containing process stream through a single port or multiple ports. Alternatively, individual hydrate inhibitors may be added at separate ports to the process stream.

The present invention may also be used in combination with other oil field flow assurance compounds such as, but not limited to, corrosion inhibitors, scale inhibitors, paraffin inhibitors, and asphaltene inhibitors. The hydrate inhibitors may also be used in combination with emulsion breakers or water clarifiers.

SIMPLE QUATERNARY AMMONIUM AND PHOSPHONIUM COMPOUNDS

Certain simple quaternary ammonium and phosphonium compounds are suitable for inhibiting formation of gas hydrate plugs in conduits containing a mixture of hydrocarbons and water, by adding to the mixture an effective amount of at least one hydrate inhibitor compound. One preferred family of hydrate inhibitor compounds has the formula:

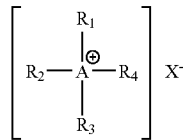

$R_1$ is selected from hydrogen and normal or branched alkyls having from 1 to 3 carbon atoms.

$R_2$ is selected from normal or branched alkyls having from 1 to 4 carbon atoms, preferably exactly 4 carbon atoms. It should be recognized that $R_1$ and $R_2$ may be the same or different, such as where $R_1$ and $R_2$ each have exactly one carbon atom.

$R_3$ is an organic moiety having 4 or 5 carbon atoms.

$R_4$ is an organic moiety having from 2 to 20 carbon atoms. In certain embodiments, $R_4$ may be selected from alkyl, alkenyl, aryl, arylalkyl, arylalkenyl, alkylaryl, alkenylaryl, glycol and combinations thereof. Alternatively, $R_4$ may include one or more heteroatoms selected from oxygen, nitrogen, sulfur and combinations thereof. Still further, $R_4$ may be chemically bound to a polymer. In one embodiment, $R_4$ is —[($CH_2$—$CHR_5$—O)]$_n$—H, $R_5$ is selected from a hydrogen, a methyl group, an ethyl group, and combinations thereof, and n ranges from 1 to 3.

A is a nitrogen atom (N) or a phosphorus atom (P).

$X^-$ is an anion. For example, $X^-$ may be selected from hydroxide, carboxylate, halide, sulfate, organic sulphonate, and combinations thereof. Suitably, the $X^-$ anion may be a halide ion selected from bromide, chloride, and combinations thereof.

In one preferred embodiment, the at least one compound is the product of a reaction between an organic halide having one of $R_1$, $R_2$, $R_3$, and $R_4$ and an amine or phosphene having the other three of $R_1$, $R_2$, $R_3$, and $R_4$. For example, the at least one compound may be the product of a reaction between butyl bromide and an N,N-dimethyl-alkylamine having between 10 and 20 carbon atoms. Suitably, the N,N-dimethyl-alkylamine may be N,N-dimethyl-hexadecylamine.

The method may be performed at any pressure, such as between 100 and 10,000 psi or even greater than 10,000 psi.

Independently, the method may include adding at least one amine salt to the mixture along with the at least one compound. For example, the amine salt may include a cation moiety that is an amine selected from ammonia, dimethylamine, diethylamine, di-n-propylamine, trimethylamine, triethylamine, tri-n-propylamine, tri-iso-propylamine, ethanolamine, diethylethanolamine, triethanolamine, methyl ethanolamine, ethyl ethanolamine, propyl ethanolamine, methyl diethanolamine, ethyl diethanolamine, dimethyl ethanolamine, diethanolamine, dibutylethanolamine, dipropylethanolamine, dibutylpropanolamine, dipropylpropanolamine, morpholine, N-methylmorpholine, N-ethylmorpholine, N-propylmorpholine, dibutylethanolamine, N,N-dibutyl-cocoamidopropylamine, and combinations thereof. Alternatively, the amine salt may include an anionic moiety that is an acid selected from carboxylic acids and inorganic acids. Suitable carboxylic acids include, with limitation, formic acid, acetic acid, propionic acid, butyric acid, glycolic acid, malonic acid, succinic acid, acrylic acid, methacrylic acid, trifluoroacetic acid, methane sulfonic acid and mixtures thereof. Suitable inorganic acids include, without limitation, nitric acid, hydrogen chloride, hydrogen bromide, and mixtures thereof.

Accordingly, the at least one compound may, for example, include at least one of the following: dimethylbutylhexadecylammonium salt; dimethylbutyloctadecylammonium bromide, dimethylbutyldodecylammonium salt; at least one ammonium salt having an ammonium compound selected from trimethylhexadecylammonium, dimethylethylhexadecylammonium, dimethylbutyloctadecylammonium, dimethylbutylhexadecylammonium, dimethylbutyldodecylammonium, dimethylbutyltetradecylammonium, propyldibutylhexadecylammonium, dipropylbutylhexadecylammonium, and mixtures thereof; or at least one phosphonium salt having a phosphonium compound selected from trimethylhexadecylphosphonium, dimethylethylhexadecylphosphonium, dimethylbutyloctadecylphosphonium dimethylbutylhexadecylphosphonium, dimethylbutyldodecylphosphonium, dimethylbutyltetradecylphosphonium, propyldibutylhexadecylphosphonium, dipropylbutylhexadecylphosphonium, and mixtures thereof.

The hydrate inhibitor compound is preferably mixed with a solvent, for example water, simple alcohols, glycols, ethers, ketonic liquids, aromatic hydrocarbons, and combinations thereof. More specifically, preferred solvents include water, methanol, ethanol, iso-propanol, n-butanol, iso-butanol, 2-ethyl hexanol, ethylene glycol, 1,2-prpylene glycols, 1,3-propylene glycol, hexylene glycol, ethylene glycol mono butylether (butyl cellosolve), ethylene glycol dibutyl ether, tetrahydrofuran, methylethylketone, methylisobutylketone, diisobutylketone, N-methylpyrrolidone, cyclohexanone, xylene, toluene, and combinations thereof.

BETAINES AND AMINE OXIDES

Other quaternary ammonium and phosphonium compounds, known as betaines and amine oxides, have also been found to be suitable for inhibiting formation of gas hydrate plugs in conduits containing a mixture of hydrocarbons and water, by adding to the mixture an effective amount of at least one hydrate inhibitor compound having the formula:

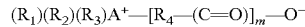

$(R_1)(R_2)(R_3)A^+$—$[R_4$—$(C=O)]_m$—$O^-$

In accordance with the invention, $R_1$, $R_2$, $R_3$ and $R_4$ are organic moieties, wherein $R_1$ is an alkyl having 4 or 5 carbon atoms, $R_2$ is hydrogen or an alkyl having from 1 to 4 carbon atoms, and $R_3$ has 2 to 20 carbon atoms. Optionally, $R_3$ has an amide functionality. In one embodiment, $R_3$ is —[($CH_2$—$CHR_5$—O)]$_n$—H, $R_5$ is selected from a hydrogen, a methyl group, and an ethyl group, and n ranges from 1 to 3. $R_4$ is preferably a normal or branched alkyl group, such as where $R_4$ is —[$CH_2$—$CHR_5$)$_n$]—, n is 0 or 1, and $R_5$ is hydrogen or an alkyl having from 1 to 3 carbon atoms.

A is N or P; and m is an integer 0 or 1.

The method may optionally include adding at least one amine salt to the mixture along with the at least one compound. Suitable amine salts include those previously described herein.

Preferred betaines may be derived from an amine and an acid, wherein the amine is selected from dibutylhexadecylamine, dibutyltetradecylamine, dibutyloctadecylamine, dibutyloleylamine, butyldicocoylamine, and mixtures thereof and the acid is selected from chloroacetic acid, acrylic acid, methacrylic acid, and mixtures thereof. Whether derived in this or a different manner, suitable betaines include, without limitation, dibutylhexadecylcarboxypropyl, dibutyltetradecylcarboxypropyl, dibutyloctadecylcarboxypropyl, dibutyloleylcarboxypropyl, butyldicocoylcarboxypropyl, dibutylhexadecylcarboxyethyl, dibutyltetradecylcarboxyethyl, dibutyloctadecylcarboxyethyl, dibutyloleylcarboxyethyl, butyldicocoylcarboxyethyl, dibutylhexadecylcarboxymethyl, dibutyltetradecylcarboxymethyl, dibutyloctadecylcarboxymethyl, dibutyloleylcarboxymethyl, butyldicocoylcarboxymethyl and mixtures thereof. Suitable amine oxides include, without limitation, butylmethylhexadecylamine, butylmethyltetradecylamine, butylmethyloctadecylamine, butylethylhexadecylamine, butylethyltetradecylamine, butylethyloctadecylamine, dibutylhexadecylamine, dibutyltetradecylamine, dibutyloctadecylamine, dibutyloleylamine, dibutylcocoylamine, butylpropylhexadecylamine, butylpropyltetradecylamine, butylpropyloctadecylamine, butylpropyloleoylamine, butyldicocoylamine, and mixtures thereof.

In one embodiment, at least one of $R_1$, $R_2$ and $R_3$ is the amide group $—[(R_5—NH—(C=O)—R_6)]$, $R_5$ is selected from $—(CH_2)_t—$, $—[CH_2—(CHR_7)_t]—$, $—(CH$ combinations thereof, wherein t is an integer 2 to 4, u is 0 or an integer (1 or greater), $R_7$ is hydrogen or an alkyl having from 1 to 3 carbon atoms, and $R_6$ is an organic moiety, for example an alkyl or alkenyl group, having 4 to 20 carbon atoms. Most preferably, $R_5$ is $—(CH_2—CHR_7O)_u—(CH_2)$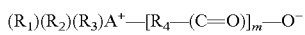.

A preferred method comprises adding to the mixture an effective amount of at least one compound having a formula:

$(R_1)(R_2)(R_3)A^+—[R_4—(C=O)]_m—O^-$ where: A is N or P; $R_1$ is an alkyl having 4 or 5 carbon atoms; $R_2$ is hydrogen or an alkyl having from 1 to 4 carbon atoms; $R_3$ is the amide group $—[(R_5—NH—(C=O)—R_6)]$, wherein $R_5$ is selected from $—CH_2)_t—$, $—[CH_2—CHR_7)_t]—$, $—(CH_2—CHR_7O)_u—(CH_2)_t—$ and combinations thereof, wherein, t is an integer 2 to 4, u is 0 or an integer (1 or greater), $R_7$ is hydrogen or an alkyl having from 1 to 3 carbon atoms, and $R_6$ is an organic moiety, such as an alkyl or alkenyl group, having 4 to 20 carbon atoms; $R_4$ is selected from $—(CH_2)_n—$, $—[CH_2—(CHR_8)_n]—$ and combinations thereof, wherein n is an integer 1 or greater and $R_8$ is an alkyl having from 1 to 3 carbon atoms; and m is 0 or 1. In one embodiment of this preferred method, m is 1 and $R_4$ is $—CH_2)_n—$. While n is an integer 1 or greater, n is preferably an integer from 1 to 10, more preferably from 2 to 4, and most preferably 2. $R_5$ is preferably $—(CH_2—CHR_7O)_u—(CH_2)_t—$, and $R_7$ is hydrogen, u is 0 or 1, and t is most preferably 3. In one embodiment, $R_1$ and $R_2$ are butyl groups.

AMIDES

Further still, the method may include adding to the mixture an effective amount of at least one amide compound having a formula:

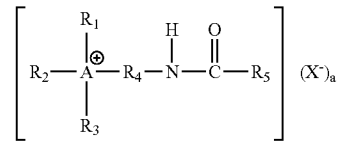

where: $R_1$, $R_2$, $R_4$, and $R_5$ are organic moieties; $R_1$ is an alkyl having from 4 to 5 carbon atoms; $R_2$ is hydrogen or an alkyl having from 1 to 4 carbon atoms; $R_4$ is selected from $—(CH_2)_t—$, $—[CH_2(CHR_6)_t]—$, $—(CH_2—CHR_6O)_u—(CH_2)_t—$ is an integer 2 to 4, u is 0 or an integer (1 or greater) $R_6$ is hydrogen or an alkyl having from 1 to 3 carbon atoms; $R_5$ is an organic moiety, such as an alkyl or alkenyl group, having 4 to 20 carbon atoms; A is N or P; $X^-$ is an anion; and a is 0 or 1. When a is 0, then $R_3$ is selected from $—[(CH_2)(CHR_6)_b(C=O)]_c—O^-$, $—[(CH_2CH_2)—(SO_2)]—O^-$, $—[(CH_2CH(OH)CH_2)—(SO_2)]—O^-$, $—[(CH_2)_n—(C=S)]—S^-$ and combinati moiety, such as an alkyl group, having from 1 to 20 carbon atoms, and combinations thereof. Preferably, $R_3$ is the same group as the group containing the amide functionality, $—R_4(NH)(C=O)R_5$.

The $X^-$ anion is preferably selected from hydroxide, carboxylate, halide, sulphate, organic sulphonate, and combinations thereof Suitable halide ions include, without limitation, bromide, chloride, and combinations thereof.

In one embodiment, $R_3$ is hydrogen, a is 1, and the anion $X^-$ is selected from hydroxide, carboxylate, halide, sulphate, organic sulphonate, and combinations thereof. In a still further embodiment, the at least one amide compound is the reaction product of an N,N-dialkyl-aminoalkylamine with an ester or glyceride. Preferably, the ester or glyceride is derived from a plant source or an animal source selected from coconut oil, tallow oil, vegetable oil, and combinations thereof.

The method may further comprise adding at least one amine salt to the mixture along with the at least one compound. Suitable amine salts include those previously described herein. Furthermore, the at least one compound may be mixed with the solvents previously described herein.

In another embodiment, the at least one compound includes a product prepared by the reaction of an amine selected from (3-dialkylamino)propylamine and (3-dialkylamino)ethylamine with vegetable oil or tallow oil followed by reacting with a reactant selected from an organic halide, for example an alkyl halide, having from 4 to 20 carbon atoms, hydrogen peroxide, and an acid, wherein the acid is selected from mineral acids, formic acid, acetic acid, chloroacetic acid, propionic acid, acrylic acid, and methacrylic acid, and wherein the dialkyl of the (3-dialkylamino)propylamine includes two alkyl groups independently selected from methyl, ethyl, propyl, butyl, morpholine, piperidine, and combinations thereof.

AMINO ALCOHOLS AND ESTER-1 COMPOUNDS

The present invention provides yet another method for inhibiting formation of gas hydrate plugs in conduits containing a mixture of hydrocarbons and water. This method comprises adding to the mixture an effective amount of at least one compound having a formula:

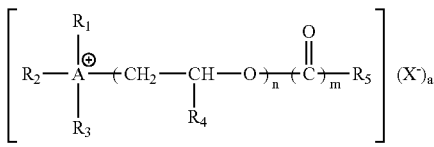

wherein: A is N or P; $R_1$ is a normal or branched alkyl group containing at least 4 carbon atoms; $R_2$ is hydrogen or an alkyl group containing from 1 to 4 carbon atoms; $R_4$ is selected from hydrogen, methyl and ethyl; $R_5$ is either H or an organic moiety, such as an alkyl chain, containing from 4 to 20 carbon atoms; $(X^-)_a$ is an anion; a is 0 or 1; n is from 1 to 3; and m is 0 or 1. When a is 0, then $R_3$ is selected from —[$(CH_2)(CHR_6)_b(C=O)]_c$—O$^-$, —[$(CH_2CH_2)$—$(SO_2)$]—O$^-$, and combinations thereof, wherein b is 0 or 1; c is 0 or 1; and $R_6$ is selected from hydrogen, methyl, ethyl or a combination thereof. When a is 1, then $R_3$ is selected from hydrogen, an organic moiety, for example an alkyl or alkenyl group, having from 2 to 20 carbon atoms, and combinations thereof. The X$^-$ anion is preferably selected from hydroxide, carboxylate, halide, sulphate, organic sulphonate, and combinations thereof. The preferred halide ions include, without limitation, bromide, chloride, and combinations thereof.

The method may further comprise adding at least one amine salt to the mixture along with the at least one compound. Suitable amine salts include those previously described herein. Furthermore, the at least one compound may be mixed with the solvents previously described herein.

In one embodiment, the at least one compound includes a product of the reaction of N-alkylamine or N,N-dialkylamine with ethylene oxide, propylene oxide or combinations thereof, followed by reacting with at least one alkyl halide having from 1 to 20 carbon atoms.

In a further embodiment, the method comprises introducing ester moieties by trans-esterification of hydroxy terminals in the alkoxy chains using methyl esters of fatty acids.

ESTER-2 COMPOUNDS

The present invention provides still another method for inhibiting formation of gas hydrate plugs in conduits containing a mixture of hydrocarbons and water. This method comprises adding to the mixture an effective amount of at least one compound having a formula:

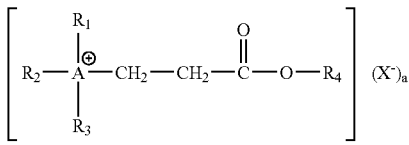

wherein: A is N or P; $R_1$ is an alkyl group containing at least 4 carbon atoms; $R_2$ is hydrogen or an alkyl group containing from 1 to 4 carbon atoms; $R_4$ is an organic moiety, for example an alkyl, alkenyl or aryl group, containing from 4 to 20 carbon atoms, optionally 8 to 16 carbon atoms; $(X)^-$ is an anion selected from hydroxide, chloride, bromide, sulfate, sulfonate, or carboxylate; and a is 0 or 1. When a is 0, then $R_3$ is selected from —[$(CH_2)(CHR_6)_b(C=O)]_c$—O$^-$, —[$(CH_2CH_2)$—$(SO_2)$]—O$^-$, —[$(CH_2CH(OH)CH_2)(SO_2)$]—O$^-$, and combinations thereof, wherein b is 0 or 1, c is 0 or 1; and $R_6$ is selected from hydrogen, methyl, ethyl, and combinations thereof. When a is 1, then $R_3$ is selected from hydrogen, an organic moiety, for example an alkyl or alkenyl group, having from 4 to 20 carbon atoms, and combinations thereof.

In one embodiment, the at least one compound includes a product of the Michael addition reaction of alkyl or N,N-dialkyl amine with an acrylate, followed by reacting with at least one organic halide, such as an alkyl halide, having from 1 to 20 carbon atoms.

Optionally, the at least one compound includes a product of the reaction of a tertiary amine containing the ester moiety with chloroacetic acid, acrylic acid or methacrylic acid. In accordance with a similar option, the at least one compound includes a product of the reaction of a tertiary amine containing the ester moiety with hydrogen peroxide.

EXAMPLE 1

Test Procedure for Evaluating Hydrate Inhibitor Compounds

The "Rocking Arm" test apparatus used for these evaluations contains "pressure cells" made of sapphire tubing containing a stainless steel ball. The cells are placed in a rack, and the rack gently rocked forward, then back. The cells are charged with liquids prior to being placed in the rack and then immersed in an insulated tank containing water. Once the cells are immersed in the bath they can then be charged with gas and the experiment begun. Sensors are used to monitor ball movement within the cells, with one sensor placed near each end of the cell. The ball falling time is recorded. This data is referred to as Sensor Activation Time and they are noted as Sensor-1 and Sensor-2.

In a typical experiment, the cells were charged with oil to brine ratios ranging from 10:1 to 1:10. A typical oil to brine ratio is about 2:1. The hydrate inhibitors were mixed with the solutions in the cells. The cells were purged with a synthetic natural gas blend, then charged with gas to the desired pressure and allowed to equilibrate at the pre-determined temperature. The bath was then cooled to a lower pre-determined temperature at specified rates. The following parameters were recorded: (1) bath temperature, (2) individual cell pressure, (3) sensor activation time, and (4) visual observations. Hydrate formation or blockage is indicated by either an increase in sensor activation time (SAT) or visual observation of hydrate particles sticking to the walls. When evaluating the sensor data the results can indicate: (1) a viscosity increase due to the formation of hydrates, which can also be due in part to oil effects; (2) a partial blockage; and (3) a complete blockage.

The inhibitor evaluations were conducted using a synthetic natural gas blend shown in Table 1. The composition of the synthetic salt water (brine) used for the inhibitor evaluations is presented in Table 2. A typical temperature—pressure profile is presented in FIG. 1. A list of inhibitor compounds that were evaluated and the results of the evaluations are summarized in Table 3 and in FIGS. 2-17. Each of these inhibitor compounds was tested as an inhibitor solution at a 3 volume % dosage rate based on the amount of water in the mixture of hydrocarbons and water. Each inhibitor solution was made up of 40 wt % inhibitor compound and 60 wt % solvent, wherein the solvent itself was a mixture of half xylene and half n-butanol.

TABLE 1

Gas Composition

| Components | Synthetic Blend Mol % |
|---|---|
| Nitrogen | 0.4 |
| Methane | 87.2 |
| Ethane | 7.6 |
| Propane | 3.1 |
| i-Butane | 0.5 |
| n-Butane | 0.8 |
| i-Pentane | 0.2 |
| n-Pentane | 0.2 |

TABLE 2

Composition of Synthetic brine

| Ions | Concentrations of Individual Ions (mg/L) |
|---|---|
| Sodium | 24000 |
| Potassium | 250 |
| Calcium | 2800 |
| Magnesium | 990 |
| Barium | 14 |
| Strontium | 95 |
| Chloride | 45019 |
| Bromide | 2200 |

TABLE 3

Inhibitor Compounds Evaluated

| Figure # | Inhibitor | Inhibitor Performance |
|---|---|---|
| 2 | None | Complete hydrate blockage at 9° C. (48.2° F.). |
| 3 | Trimethyl-hexadecyl-ammonium bromide | Partial hydrate blockage at 6° C. (42.8° F.). Later on, the hydrate broke lose. |
| 4 | Dimethyl-ethylhexadecyl-ammonium bromide | Partial hydrate blockage at 4.4° C. (40° F.). Later on, the hydrate broke lose. |
| 5 | Dimethyl-butylhexadecyl-ammonium bromide | No hydrate blockage at 4.4° C. (40° F.) in 18 hours. |
| 6 | Dimethyl-butyloctadecyl-ammonium bromide | No hydrate blockage at 4.4° C. (40° F.) in 13 hours. |
| 7 | Dipropyl-butylhexadecyl-ammonium bromide | No hydrate blockage at 4.4° C. (40° F.) in 13 hours. |
| 8 | Dibutyl-propylhexadecyl-ammonium bromide | No hydrate blockage at 4.4° C. (40° F.) in 13 hours. |
| 9 a & b | Tributyl-hexadecyl-ammonium bromide | No hydrate blockage at 4.4° C. (40° F.) in 13 hours with 3% inhibitor; complete hydrate blockage with 1% inhibitor. |
| 10 | Dimethyl-dihexadecyl-ammonium bromide | Complete hydrate blockage at 11° C. (51.8° F.). |
| 11 | N,N-Dibutyl-cocoamidopropyl carbomethoxy betaine | No hydrate blockage at 4.4° C. (40° F.) in 13 hours. |
| 12 | N,N-Dibutyl-cocoamido-propylamine oxide | No hydrate blockage at 4.4° C. (40° F.) in 13 hours. |
| 13 | N,N,N-Tributyl-cocoamidopropyl-ammonium bromide | No hydrate blockage at 4.4° C. (40° F.) in 13 hours. |
| 14 | N,N-Dibutyl-hexadecyl-cocoamidopropyl-ammonium bromide | No hydrate blockage at 4.4° C. (40° F.) in 13 hours. |
| 15 a & b | N,N-Dibutyl-triethoxyhexa-decylammonium bromide | No hydrate blockage at 4.4° C. (40° F.) in 13 hours with 1 and 3% inhibitor. |
| 16 a & b | Tributyl-hexadecyl phosphonium Bromide | No hydrate blockage at 4.4° C. (40° F.) in 13 hours with 3% inhibitor; initial hydrate blockage with 1% inhibitor. |
| 17 a & b | Blend of N,N-Dibutyl-cocoamido-propyl carboethoxy betaine and amine salt | No hydrate blockage at 4.4° C. (40° F.) in 13 hours with 1 and 3% inhibitor. |

The above examples are intended to illustrate the performance of the new inhibitors. These examples are not intended and should not be interpreted to limit their applicabilities under any other conditions such as pressure, gas composition, amount and type of oil, amount and type of water (salinity). Please also note that the performance ranking of the inhibitors noted here may be changed or reversed under a different set of conditions.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "a solution comprising a phosphorus-containing compound" should be read to describe a solution having one or more phosphorus-containing compound. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention.

The disclosure of a range of values, such as a disclosure of a compound having an alkyl having from 6 to 20 carbon atoms, shall be construed as further specifically disclosing each and every individual value there between, such as 7, 8, 9, . . . 18, 19. Where an embodiment is disclosed as including more than one range, then the disclosure shall be construed as further specifically disclosing each and every possible combination of values within those ranges. Still further, the disclosure of lists of alternative components, conditions, steps, or aspects of the invention shall be construed as specifically disclosing each and every combination of those alternatives, unless the combination is specifically excluded or mutually exclusive.

It should be understood from the foregoing description that various modifications and changes may be made in the preferred embodiments of the present invention without departing from its true spirit. It is intended that this foregoing description is for purposes of illustration only and should not be construed in a limiting sense. Only the language of the following claims should limit the scope of this invention.

What is claimed is:

1. A method for inhibiting formation of gas hydrate plugs in conduits containing a mixture of hydrocarbons and water, the method comprising:
adding at least one compound to the mixture in an effective amount for inhibiting formation of gas hydrates, the at least one compound having a formula selected from:

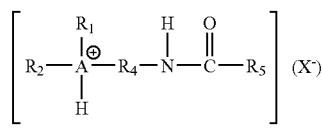

where:
$R_1$ is an alkyl having from 4 to 5 carbon atoms;
$R_2$ is hydrogen or an alkyl having from 1 to 4 carbon atoms;
$R_4$ is selected from $—(CH_2)_t—$, $—[CH_2—(CHR_6)_t]—$, $—(CH_2\text{-}CHR_6O)_u—(CH_2)_t—$ and combinations thereof, wherein t is an integer 2 to 4, u is 0 or an integer, $R_6$ is hydrogen or an alkyl having from 1 to 3 carbon atoms;
$R_5$ is an alkyl or alkenyl group having 4 to 20 carbon atoms;
A is N or P; and
$X^-$ is a carboxylate anion.

2. The method of claim 1, wherein the at least one compound is the reaction product of an N,N-dialkyl-arninoalkylarnine with an ester or glyceride.

3. The method of claim 2, wherein the ester or glyceride is derived from a plant source or an animal source selected from coconut oil, tallow oil, vegetable oil, and combinations thereof.

4. The method of claim 1, further comprising:
adding at least one amine salt to the mixture along with the at least one compound.

5. The method of claim 4, wherein the amine salt includes a cation moiety that is an amine selected from ammonia, dimethylaminc, diethylamine, di-n-propylamine, trimethylamine, triethylamine, tri-n-propylamine, tri-iso-propylamine, ethanolamine, diethylethanolamine, triethanolamine, methyl ethanolamine, ethyl ethanolamine, propyl ethanolamine, methyl diethanolamine, ethyl diethanolamine, dimethyl ethanolamine, diethanolamine, diburylethanolamine, dipropylethanolamine, dibutylpropanolamine, dipropylpropanolamine, morpholine, N-methylmorpholine, N-ethylmorpholine, N-propylmorpholine, dibutylethanolamine, and combinations thereof.

6. The method of claim 4, wherein the amine salt includes an anionic moiety that is an acid selected from carboxylic acids and inorganic acids.

7. The method of claim 4, wherein the amine salt includes an anionic moiety that is a carboxylic acid selected from formic acid, acetic acid, propionic acid, butyric acid, glycolic acid, malonic acid, succinic acid, acrylic acid, methacrylic acid, trifluoroacetic acid, methane sulfonic acid and mixtures thereof.

8. The method of claim 4, wherein the amine salt includes an anionic moiety that is an inorganic acid selected from nitric acid, hydrogen chloride, hydrogen bromide, and mixtures thereof.

9. The method of claim 1, wherein the at least one compound includes a product prepared by the reaction of an amine selected from (3-dialkylamino)propylamine and (3-dialkylamino)ethylaminc with vegetable oil or tallow oil followed by reacting with a reactant selected from an alkyl halide having from 4 to 20 carbon atoms, and an acid, wherein the acid is selected from mineral acids, formic acid, acetic acid, chloroacetic acid, propionic acid, acrylic acid, and methacrylic acid, and wherein the dialkyl of the (3-dialkylamino) propylamine includes two alkyl groups independently selected from methyl, ethyl, propyl, butyl, morpholine, piperidine, and combinations thereof.

10. The method of claim 1, wherein the at least one compound is mixed with a solvent prior to adding the at least one compound to the mixture, selected from water, simple alcohols, glycols, ethers, ketonic liquids, aromatic hydrocarbons, and combinations thereof.

11. The method of claim 1, wherein the at least one compound is mixed with a solvent prior to adding the at least one compound to the mixture, selected from water, methanol, ethanol, iso-propanol, n-butanol, iso-butanol, 2-ethyl hexanol, ethylene glycol, 1,2 propylene glycols, 1,3-propylene glycol, hexylene glycol, ethylene glycol mono butylether (butyl cellosolve), ethylene glycol dibutyl ether, tetrahydrofuran, methylerhylketone, methylisobutylketone, diisobutylketone, N-methylpyrrolidone, cyclohexanone, xylene, toluene, and combinations thereof.

12. A method for inhibiting formation of gas hydrate plugs in conduits containing a mixture of hydrocarbons and water, the method comprising:
adding at least one compound to the mixture in an effective amount for inhibiting formation of gas hydrates, the at least one compound having a formula selected from:

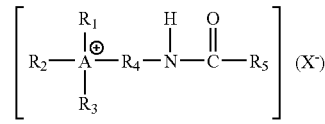

where: $R_1$ is an alkyl having from 4 to 5 carbon atoms;
$R_2$ is hydrogen or an alkyl having from 1 to 4 carbon atoms;
$R_3$ is the same group as the $—R_4(NH)(C=O)R_5$ group
$R_4$ is selected from $—(CH_2)_t—$, $—[CH_2—(CHR_6)_t]—$, $—(CH_2\text{-}CHR_6O)_u—(CH_2)_t—$ and combinations thereof, wherein t is an integer 2 to 4, u is 0 or an integer, $R_6$ is hydrogen or an alkyl having from 1 to 3 carbon atoms;

$R_5$ is an alkyl or alkenyl group having 4 to 20 carbon atoms:

A is N or P; and

X is an anion.

13. The method of claim 12, wherein the anion $X^-$ is selected from hydroxide, carboxylate, halide, sulphate, organic suiphonate, and combinations thereof.

14. The method of claim 12, wherein $R_4$ is —$(CH_2)_t$—, and wherein t is an integer 2 to 4.

15. The method of claim 1, wherein the carboxylate anion is selected from formate, acetate, propionate, acrylate, methacrylate, and combinations thereof.

16. The method of claim 1, wherein the carboxylate anion is acrylate.

17. The method of claim 1, wherein $R_4$ is —$(CH_2)_t$—, and wherein t is an integer 2 to 4.

18. The method of claim 1, wherein $R_5$ is an alkyl or alkenyl group having 12 to 14 carbon atoms.

19. The method of claim 1, wherein A is N.

20. The method of claim 19, wherein $R_4$ is —$(CH_2)_3$—, and $R_5$ is an alkyl or alkenyl group having 12 to 14 carbon atoms.

21. The method of claim 20, wherein the carboxylate anion is acrylate.

22. The method of claim 21, wherein $R_1$ and $R_2$ both have 4 carbon atoms.

* * * * *